(12) United States Patent
Willey et al.

(10) Patent No.: US 7,991,397 B2
(45) Date of Patent: Aug. 2, 2011

(54) SYSTEM AND METHOD FOR GENERATING A BLACKLIST FOR FEMTOCELLS

(75) Inventors: William Daniel Willey, Gilroy, CA (US); M. Khaledul Islam, Kanata (CA); Asif Hossain, Kanata (CA); Kwong Hang Chan, Kanata (CA); Rene Purnadi, Iriving, TX (US); Hao Xue, Kanata (CA); Shahid Chaudry, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 283 days.

(21) Appl. No.: 12/369,822

(22) Filed: Feb. 12, 2009

(65) Prior Publication Data

US 2009/0253432 A1    Oct. 8, 2009

Related U.S. Application Data

(60) Provisional application No. 61/029,151, filed on Feb. 15, 2008.

(51) Int. Cl.
*H04W 4/00* (2009.01)
*H04W 24/00* (2009.01)
*H04W 36/00* (2009.01)
*H04M 3/16* (2006.01)
*H04B 7/00* (2006.01)

(52) U.S. Cl. .............. 455/435.2; 455/410; 455/423; 455/436; 455/521; 455/432.1

(58) Field of Classification Search .......... 455/410, 455/423, 436, 521, 432.1, 435.2
See application file for complete search history.

(56) References Cited

U.S. PATENT DOCUMENTS

| | | | |
|---|---|---|---|
| 5,642,398 | A | 6/1997 | Tiedemann, Jr. |
| 6,122,503 | A | 9/2000 | Daly |
| 6,549,770 | B1 | 4/2003 | Marran |
| 6,621,795 | B1 | 9/2003 | Redi et al. |
| 7,155,219 | B2 | 12/2006 | Aerrabotu |
| 7,349,694 | B2 | 3/2008 | Lee |
| 2002/0065067 | A1 | 5/2002 | Khare et al. |
| 2002/0173275 | A1* | 11/2002 | Coutant ............. 455/67.1 |

(Continued)

FOREIGN PATENT DOCUMENTS

WO    WO 2007/148911    12/2007

OTHER PUBLICATIONS

"cdma2000 High Rate Packet Data Air Interface Specification", 3rd Generation Partnership Project 2, 3GPP2 C.S0024, Version 4.0, Oct. 25, 2002, 548 pages in total.

(Continued)

*Primary Examiner* — Ariel Balaoing

(57) ABSTRACT

Provided are systems and methods for generating a blacklist for femtocells. According to an embodiment of the application, a mobile device generates and maintains a femtocell blacklist including an identification of at least one femtocell to be avoided by the mobile device. Upon detecting a femtocell, the mobile device determines whether the femtocell is identified in the femtocell blacklist. If the femtocell is identified in the femtocell blacklist, then the mobile device avoids any attempt to use the femtocell. This might allow the mobile device to conserve battery power and reduce wireless communication resources. Since the femtocell blacklist is generated and maintained by the mobile device, the network infrastructure does not need to generate and manage the femtocell blacklist. Also, there is no need for the mobile device to download a femtocell blacklist or updates thereof from the network infrastructure.

19 Claims, 5 Drawing Sheets

U.S. PATENT DOCUMENTS

2003/0129979 A1    7/2003    Cooper
2006/0104211 A1*   5/2006    Islam et al. .................. 370/252
2008/0049702 A1*   2/2008    Meylan et al. ................ 370/342

OTHER PUBLICATIONS

"Upper Layer (Layer 3) Signaling Standard for cdma2000 Spread Spectrum Systems", 3rd Generation Partnership Project 2, 3GPP2 C.S0005-0, Version 3.0, Jun. 15, 2000, 1168 pages in total.

Knisely, Doug et al., "Femto related provisioning Enhancements for Enhanced System Selection (ESS) for Femto Cell", 25 pages in total, retrieved on Mar. 23, 2008 from: ftp://ftp.3gpp2.org/TSGC/Working/2008/2008-01-Hollywood/TSG-C-2008-01-    Hollywood/WG1/SWG14/C14-20080114-010_AIRV,%20QCOM PUZL%20Enhancements%20for%20Femto%20Cell%20ESS.pdf.

"Introduction to cdma2000 Standard for Spread Spectrum Systems", *TIA-EIA Interim Standard*, Addendum 2, TIA/EIA/IS-2000.1-2, Aug. 2001.

Zou et al., "On the White List and Black List for Femto System Selection", 3rd Generation Partnership Project 2, 3GPP2 TSG-C, 9 pages in total, retrieved on Mar. 23, 2008 from: ftp://ftp.3gpp2.org/TSGC/Working/2008/2008-02-XiamenChina/TSG-C-2008-02-Xiamen/WG1/SWG14/C1420080218-019-ALU_Femto_System_Selection.pdf.

"Over-the-Air Service Provisioning of Mobile Stations in Spread Spectrum Standards Release C", 3rd Generation Partnership Project 2, 3GPP2 C.S0016-C, Version 1.0, Oct. 22, 2004, 322 pages in total, retrieved on Mar. 23, 2008 from:ftp://ftp.3gpp2.org/TSGC/Working/2008/2008-02-XiamenChina/TSG-C-2008-02-Xiamen/WG1/SWG14/C14-20080218-010r1%20AIRV_QC_IPCOMM_VIA%20Femto%20ESS%20with%20Simplified%20PUZL.zip.

Knisely et al., "Stage 2 Approval and Proposed Workplan for Enhanced System Selection", TSG-C SWG 1.4, Jun. 16, 2008, 6 pages in total, retrieved on Mar. 23, 2008 from: ftp://ftp.3gpp2.org/TSGC/Working/2008/2008-06-Cancun/TSG-C-2008-06-Cancun/WG1/SWG14/C14-20080616-007R2_AIRV_ALU_IPC_QCOM_Sprint_VIA.ppt.

"cdma2000 1x Signaling Enhancements for Femto AP Support", Qualcomm, C22-20080825-xxx, 18 pages in total, retrieved on Mar. 23, 2008 from: ftp://ftp.3gpp2.org/TSGC/Working/2008/2008-08-Vancouver/TSG-C-2008-08-Vancouver/WG2/SWG22/C22-20080825-016%20AQ%20cdma2000%201x%20Signaling%20Enhancements%20for%20Femto%20AP%20Support_update.ppt.

International Search Report, PCT Patent Application No. PCT/US2008/084218, Mar. 25, 2009, total pages 2.

* cited by examiner

SYSTEM AND METHOD FOR GENERATING A BLACKLIST FOR FEMTOCELLS

RELATED APPLICATION

This application claims the benefit of U.S. Provisional Application No. 61/029,151 filed Feb. 15, 2008, the entire disclosure of which is incorporated herein by reference.

FIELD OF THE APPLICATION

This application relates to wireless communication, and more particularly to femtocells.

BACKGROUND

3GPP2 standards are being developed to support femtocells, which employ small base stations with a small coverage area. Femtocells might be sold by licensed operators and might operate in licensed bands. A femtocell might connect to the operator's network through an untrusted broadband connection subscribed by the user. A typical use case would be for a user to install a femtocell in his home. The femtocell would serve the user's mobile devices while at home, but would typically not serve visiting mobile devices. Visiting mobile devices are typically not authorized to use the femtocell, so it would be best to avoid having these mobile devices attempting to use the femtocell at all.

An existing approach is for the network infrastructure to manage a blacklist for a mobile device indicating femtocells that the mobile device is not to use. The mobile device downloads the blacklist to make it aware of femtocells that it is not to use. This existing approach is undesirable because it is complex for the network infrastructure to manage blacklists and provide the same to mobile devices. Also, downloading the blacklist occupies network interface capacity, especially if downloading updates to the blacklist on an ongoing basis.

There is another approach in which a static blacklist is provisioned into the mobile devices during manufacturing. The network operators plan their macro network accordingly such that subscribers that are not subscribing to femtocells will use the static blacklist and avoid selecting femtocells. The disadvantage of this approach is its inflexibility. Also, this approach involves a lot of advanced network planning. In addition, if femtocells become very popular, there is no way for a carrier to increase the number of femtocells available to its subscribers.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to a broad aspect of the application, there is provided a method for execution by a mobile device, the method comprising: generating and maintaining a femtocell blacklist comprising an identification of at least one femtocell to be avoided by the mobile device.

According to another broad aspect of the application, there is provided a computer readable medium having computer executable instructions stored thereon for execution on a processor so as to implement a method comprising: generating and maintaining a femtocell blacklist comprising an identification of at least one femtocell to be avoided by the mobile device.

According to another broad aspect of the application, there is provided a mobile device comprising: a wireless access radio configured for wirelessly communicating with femtocells; a femtocell blacklist generator configured for generating and maintaining a femtocell blacklist comprising an identification of at least one femtocell to be avoided by the mobile device; and a memory configured for storing the femtocell blacklist.

According to another broad aspect of the application, there is provided a mobile device comprising: a wireless access radio configured for wirelessly communicating with femtocells; a radio layer configured for implementing a blacklist generator for generating and maintaining a femtocell blacklist, the femtocell blacklist comprising an identification of at least one femtocell to be avoided by the mobile device; and a memory configured for storing the femtocell blacklist; wherein the radio layer comprises an upper layer signalling block that detects rejections from femtocells for generating the femtocell blacklist.

Other aspects and features of the present disclosure will become apparent, to those ordinarily skilled in the art, upon review of the following description of the specific embodiments of the disclosure.

System for Generating Femtocell Blacklist

Figure 1:
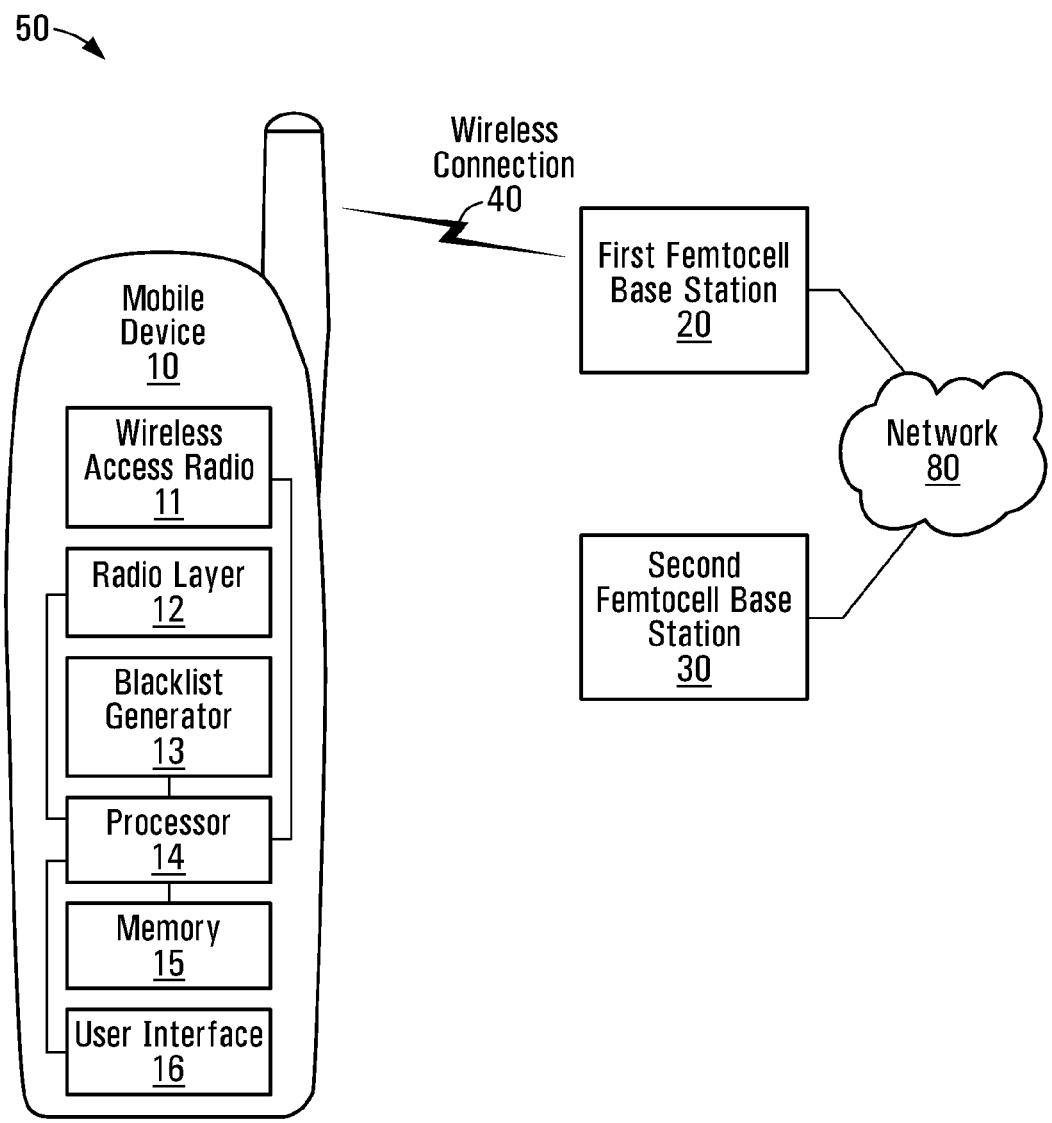
FIG. 1 is a block diagram of an example wireless system featuring a mobile device that generates and maintains a blacklist.

Referring now to FIG. 1, shown is a block diagram of an example wireless system 50 featuring a mobile device 10 that generates and maintains a femtocell blacklist. The mobile device 10 has a wireless access radio 11, a radio layer 12, a blacklist generator 13, a processor 14, a memory 15, and a user interface 16. The mobile device 10 may have other components, but they are not shown for simplicity. The wireless system 50 is shown with two femtocell base stations 20,30, which are connected to a network (80). More generally, there may be any number of femtocell base stations.

In operation, the mobile device 10 might attempt to communicate through the network 80 using one of the femtocell base stations 20,30. In the illustrated example, it is assumed that the mobile device 10 is authorised to use the first femtocell base station 20. The mobile device 10 communicates with the first femtocell base station 20 over a wireless connection 40 using the wireless access radio 11.

There may be femtocell base stations that the mobile device 10 is not authorised to use. In the illustrated example, it is assumed that the mobile device 10 is not authorised to use the second femtocell base station 30. If the mobile device does not have a femtocell blacklist indicating that the second femtocell base station 30 is to be avoided, then the mobile device 10 might make several attempts to use the second femtocell base station 30 thereby causing wireless communication between the mobile device 10 and the second femtocell base station 30. This wireless communication involves authentication signalling used for establishing service. Note that this wireless communication consumes battery power of the mobile device 10, and can also waste wireless communication resources.

According to an embodiment of the application, the blacklist generator 13 generates and maintains a femtocell blacklist including an identification of such femtocells 30 to be avoided by the mobile device 10. Examples of this generation and maintenance are provided below. Upon detecting a femtocell, the mobile device 10 determines whether the femtocell is identified in the femtocell blacklist. If the femtocell is identified in the femtocell blacklist, then the mobile device 10 avoids any attempt to use the femtocell. This might allow the mobile device 10 to conserve battery power and reduce waste of wireless communication resources.

The femtocell blacklist is stored on the mobile device, for example in the memory 15. Since the femtocell blacklist is generated and maintained by the mobile device 10, the network infrastructure does not need to generate and manage the femtocell blacklist. Also, there is no need for the mobile device 10 to download a femtocell blacklist or updates thereof from the network infrastructure.

It is to be understood that a "femtocell blacklist" is intended to cover any data structure suitable for identifying one or more femtocells to be avoided by the mobile device. In some implementations, the femtocell blacklist is a list or a table. Note that the femtocell blacklist might not be a list per se. The precise form of the femtocell blacklist is implementation specific. In some implementations, the femtocell blacklist identifies only femtocell base stations. In other implementations, the femtocell blacklist can additionally identify other non-femtocell base stations.

In some implementations, the femtocell blacklist can be configured to identify any radio access technology, such as 1x, 1x EV-DO, EDGE, UMTS/HSPA, UMB or LTE. Note that some of these technologies might be designed to deliver only data, so the reason to blacklist a system might be due to an authentication or subscription reason rather than a system capability reason. In some implementations, the femtocell blacklist includes a separate femtocell blacklist for each of a plurality of femtocell technologies that might use different radio access technologies. In a specific implementation, the femtocell blacklist includes a first femtocell blacklist for 1X Systems and a second femtocell blacklist for 1X EV-DO systems. One reason for generating and maintaining these two separate blacklists is that mobile device can periodically retry on systems in 1X blacklist but would not be in any need to retry on 1X EV-DO blacklist. Reject causes provided by the base station could be different and therefore by having separate blacklists the mobile device can process the two blacklists independently.

In the illustrated example, the femtocell blacklist generator 13 is shown as a distinct component. However, it is to be understood that the blacklist generator 13 might be part of another component. For example, in some implementations, the blacklist generator 13 is implemented in the radio layer 12, which is characterised as a component capable of creating a physical channel for wireless communication to deliver upper layer signalling messages such as upper layer 3 messages for example. Other implementations are possible. Note that rejections from femtocell base stations are typically detected by the radio layer 12. By generating the blacklist in the radio layer 12 (as opposed to a packet data service layer for example), the mobile device might consume less battery power due to reduced processing by the mobile device 10. Also, the mobile device might also occupy less network resources by avoiding authentication messaging that might be involved for implementations in which the blacklist is generated by the packet data service layer.

In the illustrated example, the blacklist generator 13 is implemented as software and is executed on the processor 14. However, more generally, the blacklist generator 13 may be implemented as software, hardware, firmware, or any appropriate combination thereof.

In some implementations, the mobile device generates and maintains another separate blacklist having an identification of at least one non-femtocell base station to be avoided by the mobile device. In some implementations, another separate blacklist identifies only non-femtocell base stations. In other implementations, another separate blacklist can additionally identify femtocell base stations. For example, a 1x blacklist can be provided for blacklisting 1x macro systems that do not support data service—and used by always on data devices so to avoid unnecessarily attempting data services on an 1x system that does not support data. Note that rejections from non-femtocell base stations are typically detected by a packet data service layer, which is at a higher level than the radio layer and is concerned with exchanging packet data. Therefore, in some implementations, the generation of another separate blacklist is executed by the packet data service layer. Other implementations are possible.

In some implementations, the user interface 16 includes an override mechanism that allows a user to provide input for overriding the femtocell blacklist. Upon receiving user input for overriding the femtocell blacklist, the mobile device 10 temporarily overrides the femtocell blacklist. This can permit the mobile device 10 to attempt to use a blacklisted femtocell (such as the second femtocell base station 30). For example, if a user is visiting a friend who has a femtocell at home, the friend can allow the user to use the femtocell temporarily. By having an override mechanism, the user can pick up the friend's femtocell and use it. There may be other uses for the user override, such as making an emergency call, etc. In some implementations, the femtocell blacklist is not cleared and it is merely ignored temporarily. In other implementations, the femtocell blacklist is cleared.

Method for Generating Femtocell Blacklist

Figure 2:
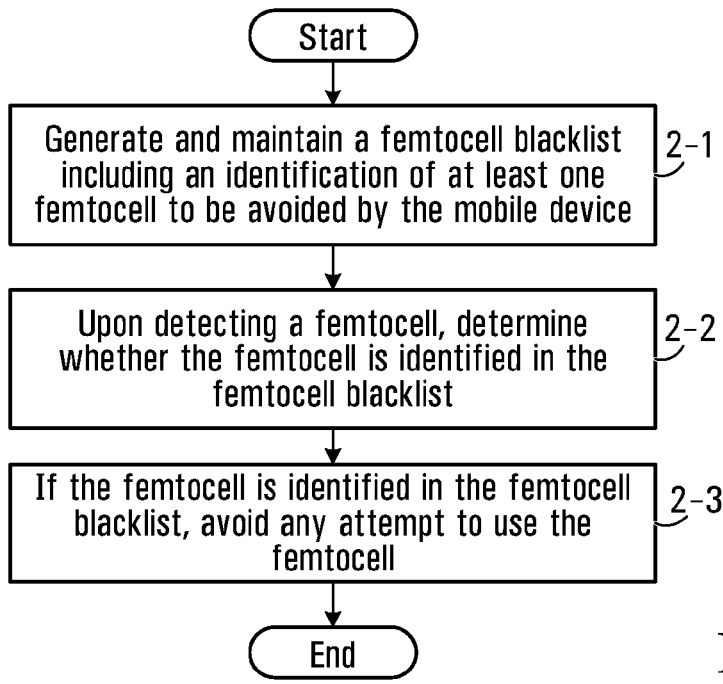
FIGS. 2 through 4 are flowcharts of example methods of generating and maintaining a blacklist.
Figure 3:
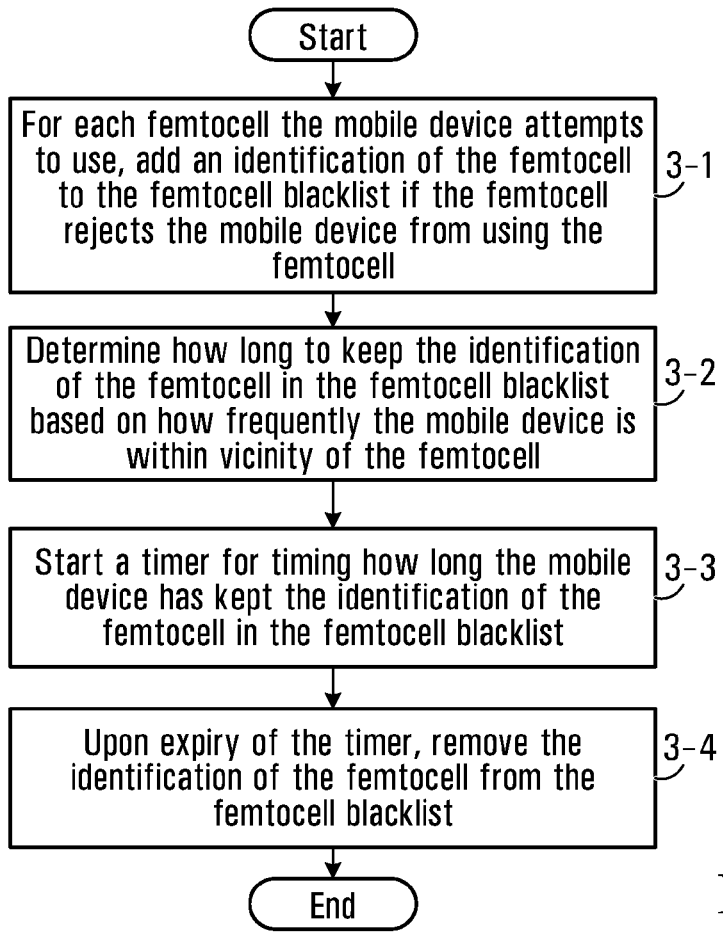
Figure 4:
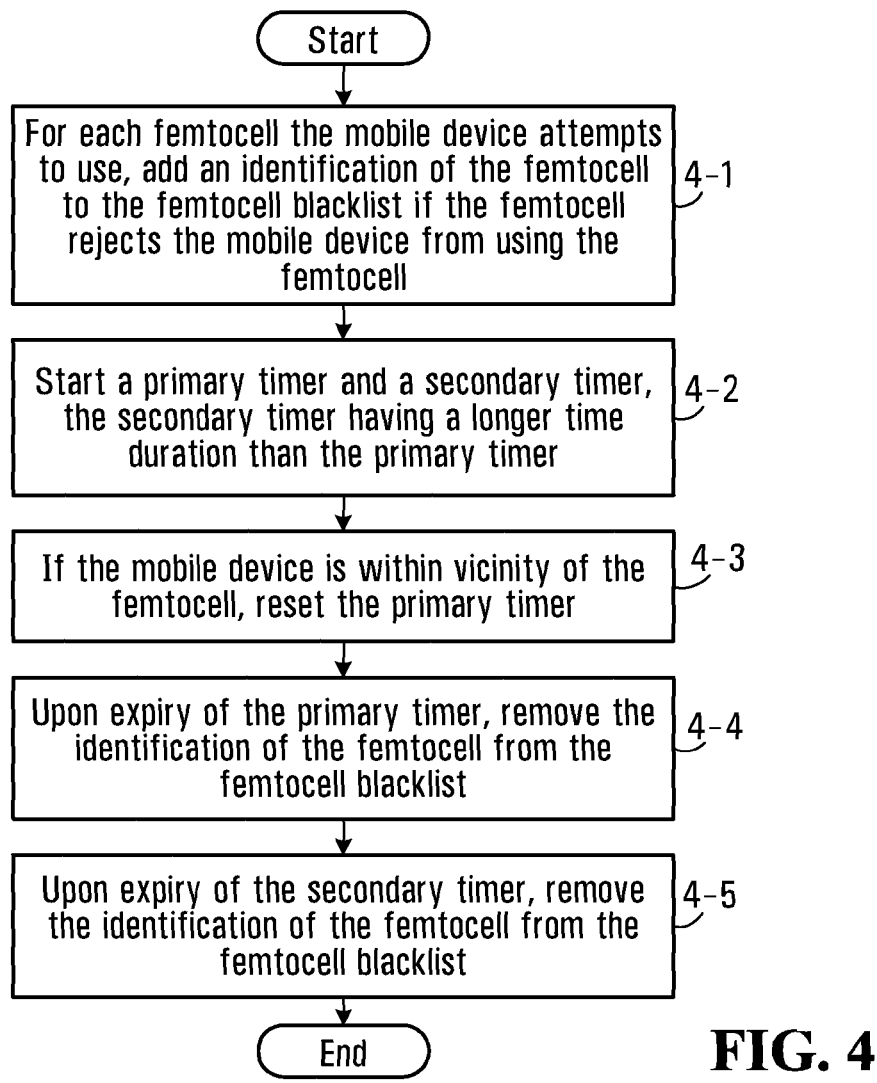

Referring now to FIGS. 2 through 4, shown are flowcharts of example methods of generating and maintaining a femtocell blacklist. These methods may be implemented in a mobile device, for example by the blacklist generator 13 of the mobile device 10 shown in FIG. 1. More generally, these methods may be implemented in any appropriate mobile device.

Referring first to FIG. 2, at block 2-1 the mobile device generates and maintains a femtocell blacklist including an identification of at least one femtocell to be avoided by the mobile device. At block 2-2, upon detecting a femtocell, the mobile device determines whether the femtocell is identified in the femtocell blacklist. At block 2-3, if the femtocell is identified in the femtocell blacklist, then the mobile device avoids any attempt to use the femtocell. This might allow the mobile device to conserve battery power and reduce wireless communication resources.

Since the femtocell blacklist is generated and maintained by the mobile device, the network infrastructure does not need to generate and manage the femtocell blacklist. Also, there is no need for the mobile device to download a femtocell blacklist or updates thereof from the network infrastructure.

In some implementations, generating the femtocell blacklist involves adding an identification of each femtocell that rejects use by the mobile device. The form of the rejection and conveyance might be dependent on femtocell technology. For 1X systems, a visiting mobile would typically be rejected at the radio layer by having the femtocell send the mobile an Intercept Order or a Reorder order or other equivalent message on the Paging Channel on response to an Origination attempt. The femtocell broadcasts the rejection on the paging channel since the mobile device does not have service with the femtocell. For 1X EV-DO systems, a visiting mobile would typically be rejected at the radio layer by having the femtocell base station send the mobile a Connection Deny message with an Authentication or Billing Failure as Deny Reason on the Default Idle State Protocol or any other equivalent message in response to a Connection Request. Again, the rejection is broadcasted since the mobile device does not have service with the femtocell.

In some implementations, rejections are sent to the mobile device on a broadcast channel because there is no dedicated channel. In some implementations, the rejection includes an identifier so that the mobile device processes the rejection. More generally, any appropriate broadcast message from which the mobile device can deduce rejection can be utilised. Other ways for the mobile device to receive a rejection are possible. As described herein, by receiving a rejection via a broadcast message, the mobile device can detect the rejections at its radio layer. In specific implementations, the mobile device detects rejections at an upper layer signalling block. In some implementations, the identification of a rejecting femtocell added to the femtocell blacklist is based on information about the femtocell collected by the radio layer. As noted above, such information might be dependent on femtocell technology.

Reference is made to the following documents describing reject order on 1x and connection deny on DO:
  1x: 3GPP2: "Upper Layer (Layer 3) Signaling Standard for cdma2000 Spread Spectrum Systems" 3GPP2 C.S0005-0_v3.0, 2000 Jun. 15, http://www.3gpp2.org/
    page 2-396 and 3-386 describe the message body itself
    page 3-14 and 2-157 describe the interaction
  DO: 3GPP2: "cdma2000 High Rate Packet Data Air Interface Specification" 3GPP2 C.S0024-0_v4.0, 2002 Oct. 25, http://www.3gpp2.org/
    page 6-37 describe the message body itself
    page 6-25 and 6-35 describe the interaction after getting the connection deny Both of these documents are incorporated by reference in their entirety.

There are many ways to identify a femtocell. In some implementations, the manner in which a femtocell is identified is dependent upon the femtocell technology being employed. In some implementations for 1X systems, the identification of a femtocell includes a SID (System Identifier), and a NID (Network Identifier). Additional granularity could be achieved by further qualifying SID/NID with a location measurement such as latitude and longitude of the femtocell, umbrella cell information, PN offset of the femtocell, frequency (e.g. frequency and bandclass) of the femtocell, registration zone number of the femtocell, packet data services zone identifier of the femtocell and/or the femtocell's base station identification. In other implementations for 1X EV-DO systems, the identification of a femtocell includes a sector address identifier (aka SectorID). Additional granularity could be achieved by further qualifying the SectorID with a location measurement such as latitude and longitude of the femtocell, umbrella cell information, PN offset of the femtocell, frequency (e.g. frequency and bandclass) of the femtocell, subnet mask of the femtocell, and/or color code of the femtocell. The above identification information of a femtocell can be collected by the radio layer 12 of the mobile device 10 shown in FIG. 1.

In some implementations, upon adding the identification of a femtocell to the femtocell blacklist, the mobile device starts a timer. Upon expiry of the timer, the mobile device removes the identification of the femtocell from the femtocell blacklist. With a single timer per blacklist entry, there is a tradeoff between timer value and blacklist size/mobile battery life. If the timer were set to a small value, entries would be dropped from the list relatively quickly. The blacklist size would be small (resulting in a memory saving in the mobile), but the mobile would attempt to use unauthorized visited femtocells more often, resulting in reduced battery life. If the timer were set to a large value, the mobile would attempt to use unauthorized femtocells less often (resulting in longer battery life), but the blacklist size would be larger, resulting in more memory being used in the mobile.

In some implementations, the timer operation is enhanced to better manage the trade-off between memory use in the mobile and mobile battery life. In some cases, the mobile may have entries in the femtocell blacklist that do not provide any benefit because the mobile attempted to use those femtocells once but never returned. On the other hand, there may be some entries in the femtocell blacklist that provide a great benefit because the mobile is often in the vicinity of those femtocells. In order to better manage this trade-off, the mobile may determine how long to keep a femtocell in the femtocell blacklist based upon how frequently the mobile detects that it is within the vicinity of that femtocell. The "frequency" that the mobile device is within the vicinity of that femtocell generally refers to timing of instances when the mobile device detects that it is within the vicinity of that femtocell. The "frequency" may be irregular and may change over time. The mobile device might detect that it is within the vicinity of the femtocell at irregular intervals. Example details are provided with the implementation described below with reference to FIG. 3.

Referring now to FIG. 3, shown is a flowchart of another method of generating and maintaining a femtocell blacklist. At block 3-1, for each femtocell the mobile device attempts to use, the mobile device adds an identification of the femtocell to the femtocell blacklist if the femtocell rejects the mobile device from using the femtocell. At block 3-2, the mobile device determines how long to keep the identification of the femtocell in the femtocell blacklist based on how frequently the mobile device is within vicinity of the femtocell. In specific implementations, if the mobile device is frequently within vicinity of the femtocell, the mobile device will keep the identification of the femtocell in the femtocell blacklist longer than if the mobile is infrequently within vicinity of the femtocell. At block 3-3, the mobile device starts a timer for timing how long the mobile device has kept the identification of the femtocell in the femtocell blacklist. At block 3-4, upon expiry of the timer, the mobile device removes the identification of the femtocell from the femtocell blacklist.

In the illustrated example, timers are used for removing identifications of femtocells from the femtocell blacklist. With a mobile-generated blacklist, the femtocell blacklist itself would not need to be provisioned by the infrastructure, but it may be desirable to have the infrastructure provision the blacklist timer information. Alternately, the timers could be configured to default values that may differ by operator. In other implementations, timers are not employed at all. More generally, for each femtocell identified in the femtocell blacklist, the mobile device removes the identification of the femtocell at some later time as determined by any appropriate means.

In some implementations, if the mobile device detects that it is within vicinity of a femtocell identified in the femtocell blacklist, then the mobile device resets the timer associated with that femtocell. By constantly resetting the timer when the mobile device remains in the vicinity of the femtocell, the femtocell would always be identified in the femtocell blacklist. Therefore, in some implementations a mechanism is provided to eventually force the identification of the femtocell to be removed from the femtocell blacklist, even though its timer is still running. In specific implementations, this is accomplished using a second order timer. An example of this is provided below with reference to FIG. 4.

Referring now to FIG. 4, shown is a flowchart of another method of generating and maintaining a femtocell blacklist. At block 4-1, for each femtocell the mobile device attempts to use, the mobile device adds an identification of the femtocell to the femtocell blacklist if the femtocell rejects the mobile device from using the femtocell. At block 4-2, the mobile device starts a primary timer and a secondary timer such that the secondary timer has longer time duration than the primary timer. If at block 4-3 the mobile device detects that it is within vicinity of the femtocell, then the mobile device resets the primary timer. If at block 4-4 the primary timer expires, then the mobile device removes the identification of the femtocell from the femtocell blacklist. Also, if at block 4-5 the secondary timer expires, then the mobile device removes the identification of the femtocell from the femtocell blacklist. Therefore, the identification of the femtocell can be removed even though its primary timer is still running. The result is that the mobile device can attempt to use the femtocell.

Figure 5:
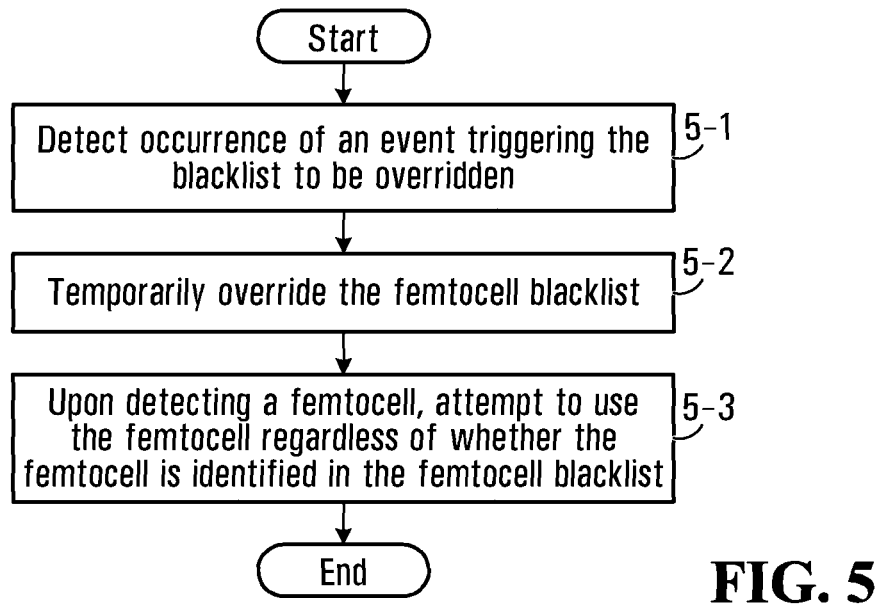
FIG. 5 is a flowchart of an example method of overriding a blacklist.

Referring now to FIG. 5, shown is a flowchart of an example method of overriding a femtocell blacklist. This method may be implemented in the mobile device 10 shown in FIG. 1. More generally, this method may be implemented in any appropriate mobile device.

At block 5-1, the mobile device detects occurrence of an event triggering the femtocell blacklist to be overridden. At block 5-2, the mobile device temporarily overrides the femtocell blacklist. At block 5-3, upon detecting a femtocell, the mobile device attempts to use the femtocell regardless of whether the femtocell is identified in the femtocell blacklist. At some later time, the femtocell blacklist is no longer overridden. In some implementations, the femtocell blacklist is not cleared and it is merely ignored temporarily. In other implementations, the femtocell blacklist is cleared.

There are many possibilities for the event triggering the femtocell blacklist to be overridden. The event triggering the femtocell blacklist to be overridden might for example include any one or more of receiving user input for overriding the femtocell blacklist, receiving a message (e.g. from the macro network) prompting the femtocell blacklist to be overridden, powering up the wireless device or other existing function, provisioning the mobile device, and placing an emergency call. Other events triggering the femtocell blacklist to be overridden are possible.

In some implementations, the femtocell blacklist is overridden for a predetermined duration of time. In other implementations, the femtocell blacklist is overridden until a predetermined number of femtocells are attempted. In other implementations, the femtocell blacklist is overridden until a femtocell is acquired.

In some implementations, the mobile device maintains a whitelist indicating femtocells that the mobile device is able to use. Upon being granted use of a femtocell, the mobile device adds an identification of the femtocell to the whitelist. In some implementations, if a femtocell on the femtocell blacklist is added to the whitelist, then the femtocell is also removed from the femtocell blacklist.

Another Mobile Device

Figure 6:
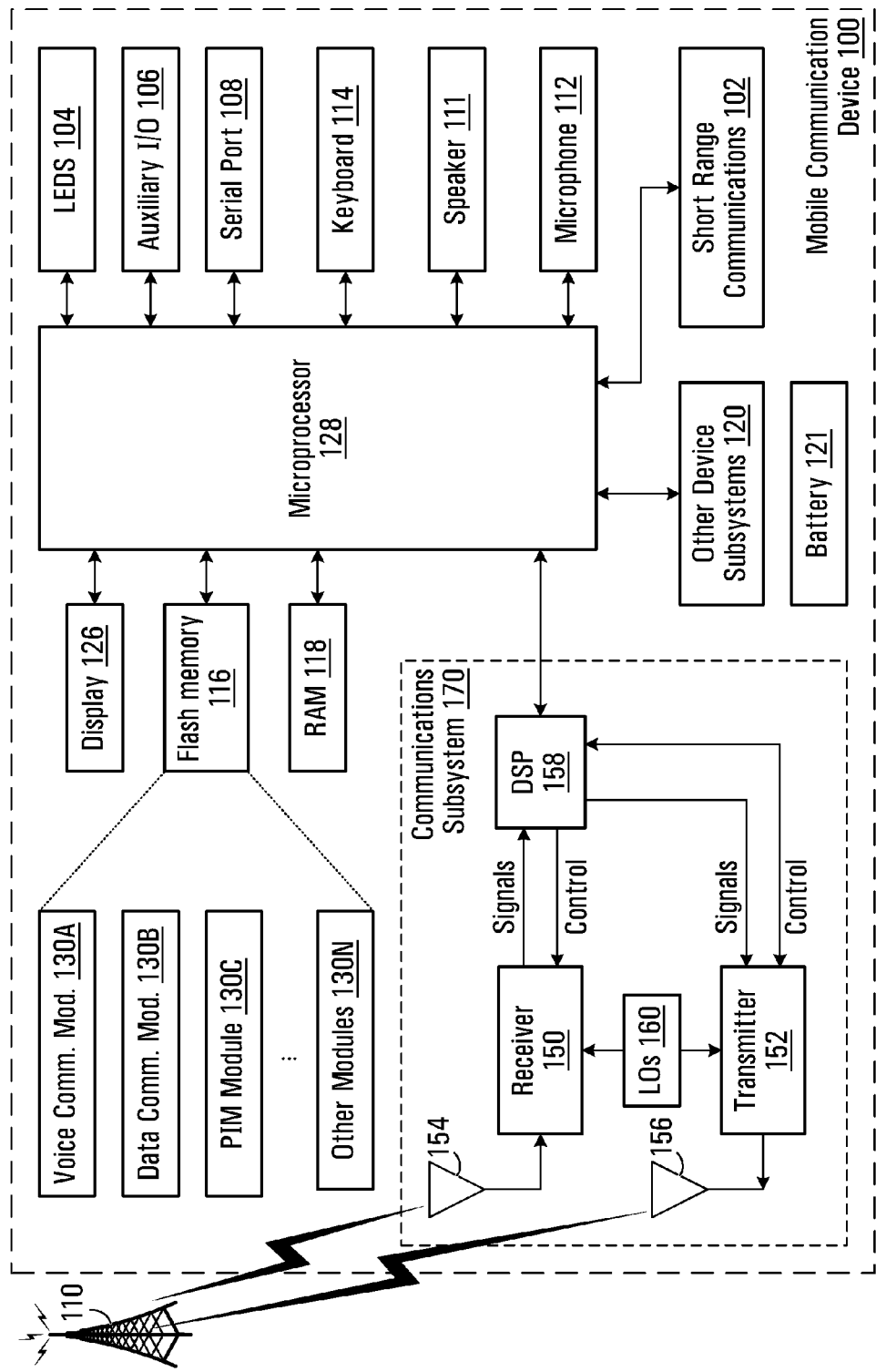
FIG. 6 is a block diagram of another mobile device.

Referring now to FIG. 6, shown is a block diagram of another mobile device 100 that may implement any of the mobile device methods described herein. The mobile device 100 is shown with specific components for implementing features similar to those of the mobile device 10 of FIG. 1. It is to be understood that the mobile device 100 is shown with very specific details for exemplary purposes only.

A processing device (a microprocessor 128) is shown schematically as coupled between a keyboard 114 and a display 126. The microprocessor 128 is a type of processor with features similar to those of the processor 14 of the mobile device 10 shown in FIG. 1. The microprocessor 128 controls operation of the display 126, as well as overall operation of the mobile device 100, in response to actuation of keys on the keyboard 114 by a user.

The mobile device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

The flash memory 116 stores computer executable instructions for implementing features similar to those of the blacklist generator 13 and the radio layer 12 of the mobile device 10 shown in FIG. 1. In a specific implementation, the other module 130N of the flash memory 116 stores computer executable instructions that when executed implement a radio layer including a blacklist generator. In this particular example, the "radio layer" includes a combination of components that are configured or controlled by the executable instructions. The combination of components might for example include the flash memory 116, the microprocessor 128, the RAM 118, and the communications subsystem 170. Note that the implementations described with reference to FIG. 6 are very specific for exemplary purposes.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a wireless access radio with features similar to those of the wireless access radio 11 of the mobile device 10 shown in FIG. 1. The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Rejections at Upper Layer Signalling Block

Figure 7:
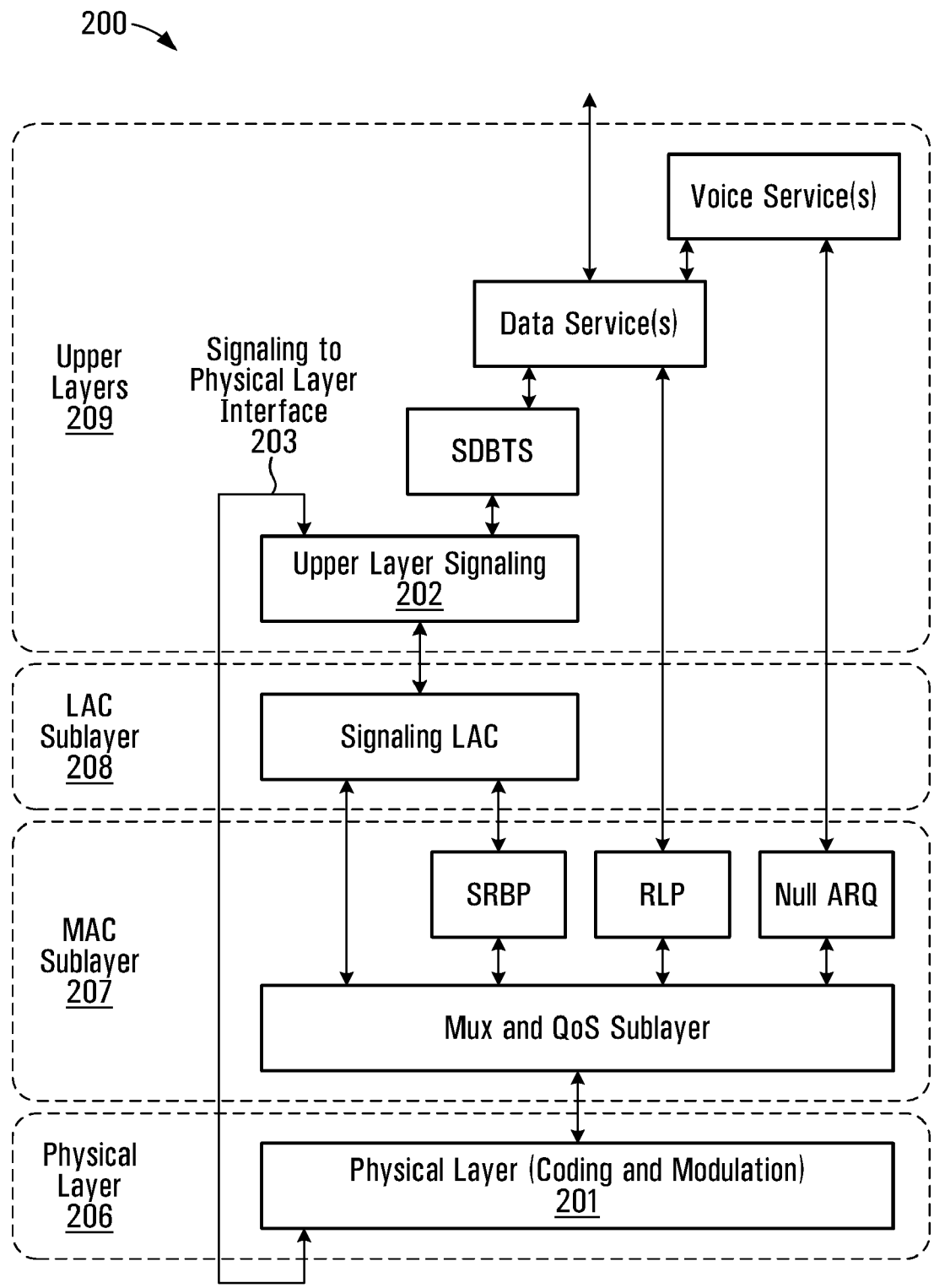
FIG. 7 is a block diagram showing an architecture in which rejections from femtocells are detected at an upper layer signalling block.

Referring now to FIG. 7, shown is a block diagram showing an architecture 200 in which rejections from femtocells are detected at an upper layer signalling block 202. The architecture 200 can be implemented by a mobile device, for example by the mobile device 10 shown in FIG. 1, or by the mobile device 100 shown in FIG. 6. More generally, the architecture 200 can be implemented by any appropriate mobile device. In the particular example depicted, the architecture 200 is for CDMA2000. Application to other technologies may be possible with appropriate modification. It is to be understood that the architecture 200 is very specific for exemplary purposes only.

The architecture 200 includes a physical layer 206, a MAC sublayer 207, a LAC sublayer 208, and upper layers 209. The physical layer 206 includes block 201 for coding and modulation. The upper layer signalling block 202 is shown as part of the upper layers 209. The architecture 200 includes other blocks as shown in the illustrated example. Note that there may be additional blocks, but they are not shown for sake of simplicity.

In operation, there is signalling 203 between the physical layer 206 and the upper layer signalling block 202. When the mobile device receives a rejection from a femtocell, for example via a broadcast message, the rejection is detected by the upper layer signalling block 202. In this manner, the rejection is not detected at higher-levels such as the data services(s) block. By detecting rejections and subsequently generating the blacklist at a lower level, there might be benefits such as reduced processing thereby conserving battery power. Also, the mobile device might avoid authentication messaging involved for implementations in which the rejections are detected at a higher level.

Numerous modifications and variations of the present application are possible in light of the above teachings. It is therefore to be understood that within the scope of the appended claims, the application may be practised otherwise than as specifically described herein.

We claim:

1. A method for execution by a mobile device, the method comprising:
   generating and maintaining a femtocell blacklist comprising an identification of at least one femtocell to be avoided by the mobile device;
   for each femtocell identified in the femtocell blacklist, determining how long to keep the identification of the femtocell in the femtocell blacklist based on how frequently the mobile device is within vicinity of the femtocell, and removing the identification of the femtocell from the femtocell blacklist according to how long the mobile device determines to keep the identification of the femtocell in the femtocell blacklist;
   detecting occurrence of an event triggering the femtocell blacklist to be overridden, wherein the event triggering the femtocell blacklist to be overridden comprises receiving a message from a macro network prompting the femtocell blacklist to be overridden; and
   upon occurrence of the event, temporarily overriding the femtocell blacklist.

2. The method of claim 1 further comprising:
   upon detecting a femtocell:
   determining whether the femtocell is identified in the femtocell blacklist; and
   if the femtocell is identified in the femtocell blacklist, avoiding any attempt to use the femtocell.

3. The method of claim 1 wherein generating the femtocell blacklist comprises:
   generating the femtocell blacklist by a radio layer of the mobile device.

4. The method of claim 3 wherein the radio layer comprises an upper layer signalling block, the upper layer signalling block detecting rejections from femtocells for generating the femtocell blacklist.

5. The method of claim 4 wherein generating and maintaining the femtocell blacklist comprises:
   for each femtocell the mobile device attempts to use, adding an identification of the femtocell to the femtocell blacklist if the upper layer signalling block detects rejection from the femtocell, the identification of the femtocell being based on information about the femtocell collected by the radio layer.

6. The method of claim 5 wherein the identification of the femtocell comprises:
   (a) for 1X systems, a System Identifier 'SID' and a Network Identifier 'NID'; or
   (b) for 1X EV-DO systems, a sector address identifier 'SectorID'.

7. The method of claim 5 wherein generating the femtocell blacklist further comprises:
   for each femtocell the mobile device attempts to use, qualifying whether to add the identification of the femtocell to the femtocell blacklist based the information about the femtocell collected by the radio layer, where the information comprises at least one of the following: a location measurement, both latitude and longitude of the femtocell, umbrella cell information, PN offset of the femtocell, frequency of the femtocell, both frequency and bandclass of the femtocell, registration zone number of the femtocell, packet data services zone identifier of the femtocell, femtocell base station identification, subnet mask of the femtocell, and color code of the femtocell.

8. The method of claim 4, wherein each rejection is detected on a broadcast channel.

9. The method of claim 1 wherein the femtocell blacklist comprises a separate femtocell blacklist for each of a plurality of femtocell technologies.

10. The method of claim 9 wherein the femtocell blacklist comprises a first femtocell blacklist for 1X Systems and a second femtocell blacklist for 1X-EVDO systems.

11. The method of claim 1 further comprising:
    generating and maintaining another blacklist comprising an identification of at least one base station to be avoided by the mobile device.

12. The method of claim 1 wherein the femtocell blacklist further comprises:
    an identification of at least one non-femtocell base station to be avoided by the mobile device.

13. A non-transitory computer readable storage medium having computer executable instructions stored thereon for execution on a processor, the computer executable instructions for:
    generating and maintaining a femtocell blacklist comprising an identification of at least one femtocell to be avoided by the mobile device;
    for each femtocell identified in the femtocell blacklist, determining how long to keep the identification of the femtocell in the femtocell blacklist based on how frequently the mobile device is within vicinity of the femtocell, and removing the identification of the femtocell from the femtocell blacklist according to how long the mobile device determines to keep the identification of the femtocell in the femtocell blacklist
    detecting occurrence of an event triggering the femtocell blacklist to be overridden, wherein the event triggering the femtocell blacklist to be overridden comprises receiving a message from a macro network prompting the femtocell blacklist to be overridden; and
    upon occurrence of the event, temporarily overriding the femtocell blacklist.

14. A mobile device comprising:
    a wireless access radio configured for wirelessly communicating with femtocells;
    a memory configured for storing a femtocell blacklist; and
    a blacklist generator configured for generating and maintaining the femtocell blacklist comprising an identification of at least one femtocell to be avoided by the mobile device, wherein the blacklist generator is configured to determine, for each femtocell identified in the femtocell blacklist, how long to keep the identification of the femtocell in the femtocell blacklist based on how frequently the mobile device is within vicinity of the femtocell, and remove the identification of the femtocell from the femtocell blacklist according to how long the mobile device determines to keep the identification of the femtocell in the femtocell blacklist;
    detect occurrence of an event triggering the femtocell blacklist to be overridden, wherein the event triggering the femtocell blacklist to be overridden comprises receiving a message from a macro network prompting the femtocell blacklist to be overridden; and upon occurrence of the event, temporarily override the femtocell blacklist.

15. The mobile device of claim 14 wherein the blacklist generator is implemented by a radio layer of the mobile device.

16. The mobile device of claim 15 wherein the radio layer comprises an upper layer signalling block, the upper layer signalling block being configured to detect rejections from femtocells for generating the femtocell blacklist.

17. The mobile device of claim 16 wherein the mobile device is configured to generate and maintain the femtocell blacklist by:

for each femtocell the mobile device attempts to use, adding an identification of the femtocell to the femtocell blacklist if the upper layer signalling block detects rejection from the femtocell.

18. The mobile device of claim 14 further comprising:

a user interface configured to receive user input for overriding the femtocell blacklist;

wherein the mobile device is configured to temporarily override the femtocell blacklist upon receiving the user input.

19. The method of claim 1, further comprising:

maintaining a femtocell whitelist indicating femtocells that the mobile device is able to use; and adding an identification of a useable femtocell to the femtocell whitelist upon being granted use of the useable femtocell.

* * * * *